(12) United States Patent
Olson

(10) Patent No.: US 9,888,351 B2
(45) Date of Patent: Feb. 6, 2018

(54) WEARABLE DEVICE

(71) Applicant: 3G Innovations, LLC, Fentress, TX (US)

(72) Inventor: Timothy Olson, Lockhart, TX (US)

(73) Assignee: 3G Innovations LLC, Lockhart, TX (US)

( * ) Notice: Subject to any disclaimer, the term of this patent is extended or adjusted under 35 U.S.C. 154(b) by 0 days.

(21) Appl. No.: 15/287,833

(22) Filed: Oct. 7, 2016

(65) Prior Publication Data

US 2017/0105096 A1    Apr. 13, 2017

Related U.S. Application Data

(60) Provisional application No. 62/239,682, filed on Oct. 9, 2015.

(51) Int. Cl.
| | |
|---|---|
| *H04B 5/00* | (2006.01) |
| *H04B 7/00* | (2006.01) |
| *H04B 1/00* | (2006.01) |
| *H04W 4/02* | (2009.01) |
| *H04B 17/318* | (2015.01) |
| *H04L 12/26* | (2006.01) |
| *H04W 68/00* | (2009.01) |

(52) U.S. Cl.
CPC ......... *H04W 4/023* (2013.01); *H04B 17/318* (2015.01); *H04L 43/16* (2013.01); *H04W 68/005* (2013.01)

(58) Field of Classification Search
CPC .................................................. H04W 4/023
USPC ................. 455/41.2, 18, 419, 531
See application file for complete search history.

(56) References Cited

U.S. PATENT DOCUMENTS

| | | | |
|---|---|---|---|
| 6,050,695 A | 4/2000 | Fromm | |
| 9,715,815 B2* | 7/2017 | Verma | G08B 21/24 |
| 2004/0037067 A1 | 2/2004 | Elwonger | |
| 2005/0056053 A1* | 3/2005 | Jacquin | A44C 25/00 63/33 |
| 2008/0001735 A1* | 1/2008 | Tran | G06F 19/3418 340/539.22 |
| 2011/0034134 A1 | 2/2011 | Henderson | |
| 2011/0195665 A1* | 8/2011 | Friedlaender | G08C 17/02 455/41.2 |
| 2011/0214158 A1* | 9/2011 | Pasquero | G06F 21/35 726/2 |

(Continued)

OTHER PUBLICATIONS

Search Report and Written Opinion, PCT/US16/55991, dated Aug. 1, 2017, 10 pages.

*Primary Examiner* — Tilahun B Gesesse
(74) *Attorney, Agent, or Firm* — Cesari & Reed LLP; R. Michael Reed

(57) ABSTRACT

The present disclosure generally relates to systems and methods for electronic devices configured to be worn, and further configured to pair wirelessly to similar devices. In certain embodiments, an apparatus may include a first wearable device. The first wearable device may include an attachment mechanism configured to enable the first wearable device to be worn, a receiver configured to detect wireless signals, and a control circuit. The control circuit may be configured to monitor for a signal from a second wearable device paired to the first wearable device, and to generate an indicator based on a proximity of the second wearable device to the first wearable device.

18 Claims, 11 Drawing Sheets

(56) References Cited

U.S. PATENT DOCUMENTS

| | | |
|---|---|---|
| 2011/0216931 A1 | 9/2011 | Bui |
| 2012/0176774 A1 | 7/2012 | Hermann |
| 2013/0036766 A1 | 2/2013 | Zimmerman |
| 2014/0073262 A1* | 3/2014 | Gutierrez ............... G08B 13/22 455/67.11 |
| 2014/0232615 A1* | 8/2014 | Acosta ..................... H04B 5/02 345/1.2 |
| 2015/0348384 A1 | 12/2015 | Tam et al. |
| 2016/0037573 A1* | 2/2016 | Ko ...................... H04L 63/0876 455/41.2 |
| 2016/0044445 A1* | 2/2016 | Hu .......................... H04B 5/00 455/41.3 |
| 2016/0080855 A1 | 3/2016 | Greenberg et al. |
| 2016/0105924 A1* | 4/2016 | Baek .................... H04W 4/008 455/41.2 |
| 2016/0301791 A1* | 10/2016 | Kim .................... H04M 1/7253 |
| 2017/0031556 A1* | 2/2017 | Yang .................... G06F 3/0488 |

* cited by examiner

WEARABLE DEVICE

CROSS-REFERENCE TO RELATED APPLICATION(S)

The present application is a non-provisional application of and claims priority to U.S. provisional patent application No. 62/239,682, filed Oct. 9, 2015, entitled "Wearable Device", the contents of which are hereby incorporated by reference in its entirety.

FIELD OF THE DISCLOSURE

The present disclosure generally relates to systems and methods for electronic devices configured to be worn, and further configured to pair wirelessly to other similar devices.

SUMMARY

In certain embodiments, a device may comprise a first bracelet including a transceiver configured to transmit and receive wireless signals, and including a circuit. The circuit may be configured to exchange identifying information with a second bracelet via the transceiver, detect a particular signal associated with the second bracelet, determine a proximity of the second bracelet to the first bracelet based on the particular signal, and generate an indicator based on the proximity.

In some embodiments, an apparatus may include a first wearable device with an attachment mechanism configured to enable the first wearable device to be worn. The wearable device can include a control circuit and a receiver configured to detect wireless signals. The control circuit may be configured to monitor for a signal from a second wearable device paired to the first wearable device and selectively generate an indicator based on a proximity of the second wearable device to the first wearable device.

In other embodiments, a device can include a first bracelet. The first bracelet may include a control circuit and a transceiver to transmit and receive wireless signals. The control circuit may be configured to pair with a second bracelet via the transceiver by exchanging identifying information with the second bracelet, detect a particular signal associated with the second bracelet, and determine proximity of the second bracelet to the first bracelet based on the particular signal. The control circuit may generate an indicator based on the proximity.

In still other embodiments, a wearable device can include an attachment mechanism configured to enable the first wearable device to be worn. Further, the wearable device may include a transceiver configured to send and receive wireless signals, at least one display element, and a control circuit coupled to the transceiver and to the at least one display element. The control circuit may be configured to determine a received signal corresponds to a second wearable device that was previously paired to the first wearable device and selectively control the at least one display element to provide a visible indication of proximity the second wearable device in response to determining the received signal.

BRIEF DESCRIPTION OF THE DRAWINGS

In the following discussion, reference numerals may be used in the various drawings to indicate the same or similar elements.

DETAILED DESCRIPTION

Figure 1:
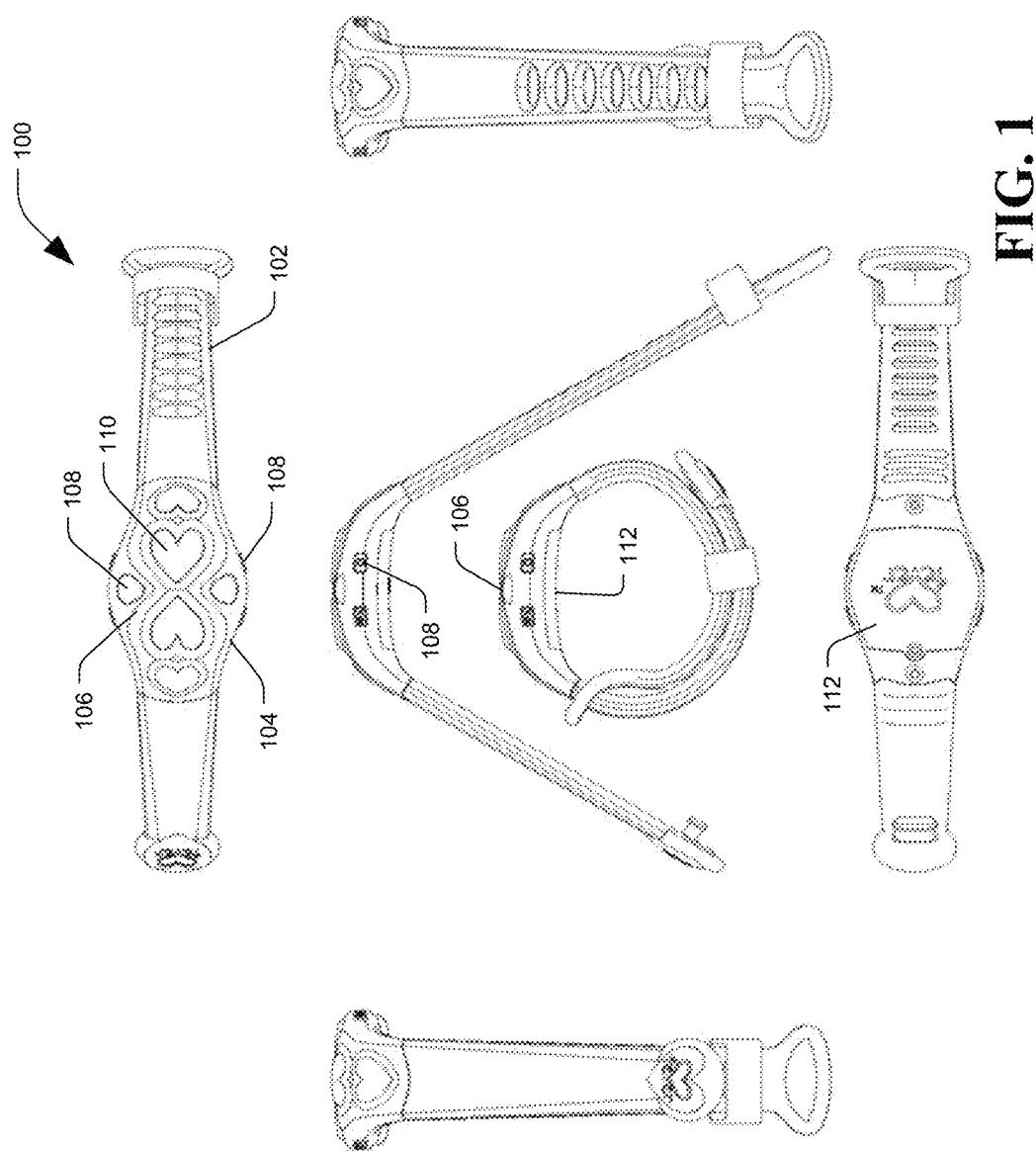
FIG. 1 depicts multiple views of a wearable device, in accordance with certain embodiments of the present disclosure.

In the following detailed description of the embodiments, reference is made to the accompanying drawings which form a part hereof, and which are shown by way of illustrations. Features of the various described embodiments may be combined, other embodiments may be utilized, and structural changes may be made without departing from the scope of the present disclosure. Further, features of the various embodiments and examples herein can be combined, exchanged, or removed without departing from the scope of the present disclosure.

In accordance with some embodiments, the methods and functions described herein may be implemented as one or more software programs, firmware programs, or embedded scripts that can be executed by a processor or controller circuit. Dedicated hardware implementations including, but not limited to, application specific integrated circuits (ASICs), programmable logic arrays (PLAs), field-programmable gate arrays (FPGAs) and other hardware devices can likewise be constructed to implement the methods and functions described herein. Further, the methods described herein may be implemented as a device, including a non-volatile computer readable storage device or memory device storing instructions that, when executed, cause a processor to perform the methods.

In certain embodiments, an electronic device may include a wireless transceiver, a processor, and a memory, which may store one or more device identifiers. The electronic device may be configured to wirelessly pair or synch with another electronic device and to provide a notification (or indicator) when the paired (or synched) device is within a certain range or leaves a certain range. A device may be paired to or synched to another device by exchanging identifying information when in a pairing mode, and by storing data that identifies the other device. In some embodiments, the pairing process may be bi-directional, in which two devices exchange data allowing each device to recognize the other. Devices may be pre-paired by a manufacturer or a distributor, or may be paired by end users, or any combination thereof.

The devices may include wearable articles and accessories, such as bracelets, rings, necklaces or pendants, armbands, headbands, pins, clip-ons, hats, key chains, other jewelry or accessories, or other wearable articles. In some embodiments, different kinds of devices may be paired; for example, a bracelet may be paired with a necklace. In an example embodiment, friends may each own a bracelet and could pair their bracelets with each other, by initiating a pairing operation and having their bracelets exchange identifying information. Subsequently each bracelet may detect signals from the other bracelet, with each bracelet providing an indication when the other bracelet is nearby (within a pre-determined range). In this manner, the devices may detect one another and may notify their respective users of the detected device, encouraging the users to look for one another. One possible embodiment of a wearable device is shown in FIG. 1.

FIG. 1 depicts a number of views of a wearable device, in accordance with certain embodiments of the present disclosure. In the depicted embodiment, the wearable device may include a bracelet 100. The bracelet 100 may include an attachment mechanism enabling the bracelet to be worn, such as a wrist strap (or band) 102 having elements for adjusting a size of the wrist strap 102. For example, the wrist strap 102 may include a clasp or buckle and multiple holes at different distances along the wrist strap 102. In an alternative embodiment, the wrist band 102 may include hook and loop fasteners, buttons, latches, other elements, or any combination thereof. In some embodiments, the devices may be implemented as bracelets, rings, necklaces or pendants, armbands, headbands, pins, clip-ons, hats, key chains, other jewelry or accessories, or other wearable articles.

The bracelet 100 may include a body 104 having an outward-facing portion (face portion) 106 and a rear-facing back portion 112. The body 104 and face portion 106 may include one or more input elements 108, which may be configured to receive input from a user. Such input elements 108 may include buttons, touchscreens, knobs, switches, other input elements, or any combination thereof. In response to a user interaction, the input elements 108 may be configured to generate a signal, which may be received by a controller of the bracelet 100. In a particular example, each input element 108 may be proximate to a switch coupled to a circuit of the bracelet 100, such that user interaction with the input element 108 causes the switch to be depressed to produce a signal. Such signals may direct the controller to change operating modes of the bracelet 100, to select or change settings, to search for signals from other devices, to send signals to other devices, to perform other functions, or any combination thereof.

The face portion 106 of the bracelet 100 may include one or more indicators or display elements 110, which may be configured to provide a notification or indicator when a paired device is within a certain range, or leaves a certain range. The bracelet 100 may provide a visual indicator in response to detecting or losing a signal from a paired device, and not based on establishing a communication link with the paired device. The indicator elements 110 may include visual display components such as lights (such as light emitting diodes), digital display screens, other display elements, or any combination thereof. For example, a display component could provide notifications by lighting up, flashing, displaying a text or image notification, providing other visual notifications, or any combination thereof.

In some embodiments, the indicator elements 110 of FIG. 1 may include translucent panels with light emitting diodes (LEDs) located behind the panels. The panels may be heart-shaped or may have a different shape. In some examples, the panels may be shaped like a logo of a sports franchise or may be shaped like an item associated with a sport (such as a hockey stick, a baseball bat, or another item). Further, in some embodiments, the surface of the face portion 106 of the bracelet 100 may be formed from a transparent screen or substrate with an opaque vinyl positioned underneath the screen. Holes may be provided in the substrate beneath the input elements 108 to facilitate a physical coupling between the input element 108 and a corresponding switch or circuit component within the bracelet 100. Further, in some embodiments, the vinyl may include cutouts having selected shapes adjacent to LEDs to provide selected light shapes. The cutouts may have any of the shapes mentioned herein, depending on the implementation.

When a controller within the bracelet 100 detects a paired device nearby (e.g. using a receiver to detect a signal emitted from the paired device), the controller may cause the LEDs to flash, indicating that a paired device is nearby. Display components may include digital display screen that can display a name associated with the detected paired device, or any other information or provide graphical display (such as an image). Indicator elements 110 can also include LEDs, speakers, vibrating elements (e.g. a piezoelectric element), liquid crystal display (LCD) screens, other components capable of generating notifications, or any combination thereof. In some embodiments, the indicator elements 110 may also function as an input element, for example, such as push-button or touch-screen functionality.

A user may interact with one or more input elements 108 in order to put the bracelet 100 into a pairing mode, in which the bracelet 100 may send out one or more pairing signals to other devices, or search for pairing signals from other devices, or both. A user may interact with the input elements 108 to initiate a search for signals from nearby paired devices, and the bracelet 100 may provide an indication via indicator elements 110 when a paired device is detected or is not detected, such as by flashing lights, changing colors of lights, displaying data on a display, or any combination thereof.

In some embodiments, a user may interact with input elements 108 to direct the bracelet 100 to transmit a notification signal to paired devices. The notification signal may direct paired devices to generate specific indicators based on the received notification signal. For example, the bracelet 100 may transmit a "find friends" notification signal. Paired devices receiving the "find friends" notification signal may flash a specific-colored light, generate a message (text or audio), or generate another indication that the user of the bracelet 100 needs help, wants to be found, or wants to meet up. The bracelet 100 may allow a user to send notifications to specific paired devices, send notifications to all paired devices or any paired devices in range, or any combination thereof.

In some embodiments, the bracelet 100 may have assign a particular indicator element 110 (or subset of indicator elements) of a plurality of indicator elements for each paired device. Each indicator element 110 may also be configured to provide multiple types of indications. For example, when a paired device corresponding to an indicator element 110 is detected in-range, a light of a first color may flash at the corresponding indicator element 110. When a "find friends" notification signal is received from a paired device, a light of a second color may flash at the corresponding indicator element 110. In some embodiments, in the context of "find friends", the indicator may continue to flash until the paired devices are within a pre-determined range of one another (which can be determined by controllers within each of the paired devices based, for example, on the received signal strength). Other embodiments are also possible.

In another embodiment, the bracelet 100 may be configured to detect a pre-defined signal from other devices, and react in a particular manner. In some embodiments, the pre-defined signal may represent a manufacturer-configured pairing and may be provided without input from a user. For example, devices may branded by a particular sports team, and devices for a given sports team may emit a particular signal pattern. The devices may be preconfigured to emit this pattern and recognize the pattern from other devices. When devices emitting the signal corresponding to the given sports team come within a threshold distance, the bracelet 100 may issue a notification (e.g by playing an anthem or chant for the team, or flashing the team's colors). In this manner users may recognize other individuals having similar interests or who support similar teams. The bracelet 100 may be configured to emit or detect a variety of pre-defined signals. For example, using inputs 108 a user may select a particular sports team from a list of options, and the bracelet 100 may then search for or emit the signal corresponding to the selected team. Other embodiments are also possible.

While the above-examples have been directed to friend pairing or sports themed pairing of devices, other examples are also possible. For example, a school may issue such bracelets to members of a particular team (such as orchestra, debate, or other organizations) to facilitate team bonding in a large setting, such as an event. While the above-discussion relates to a wearable device that is implemented as a bracelet 100, it should be appreciated that the functionality, input elements, and other features may be incorporated into a wide variety of wearable devices. One possible implementation of such a wearable device is described below with regard to FIG. 2.

Figure 2:
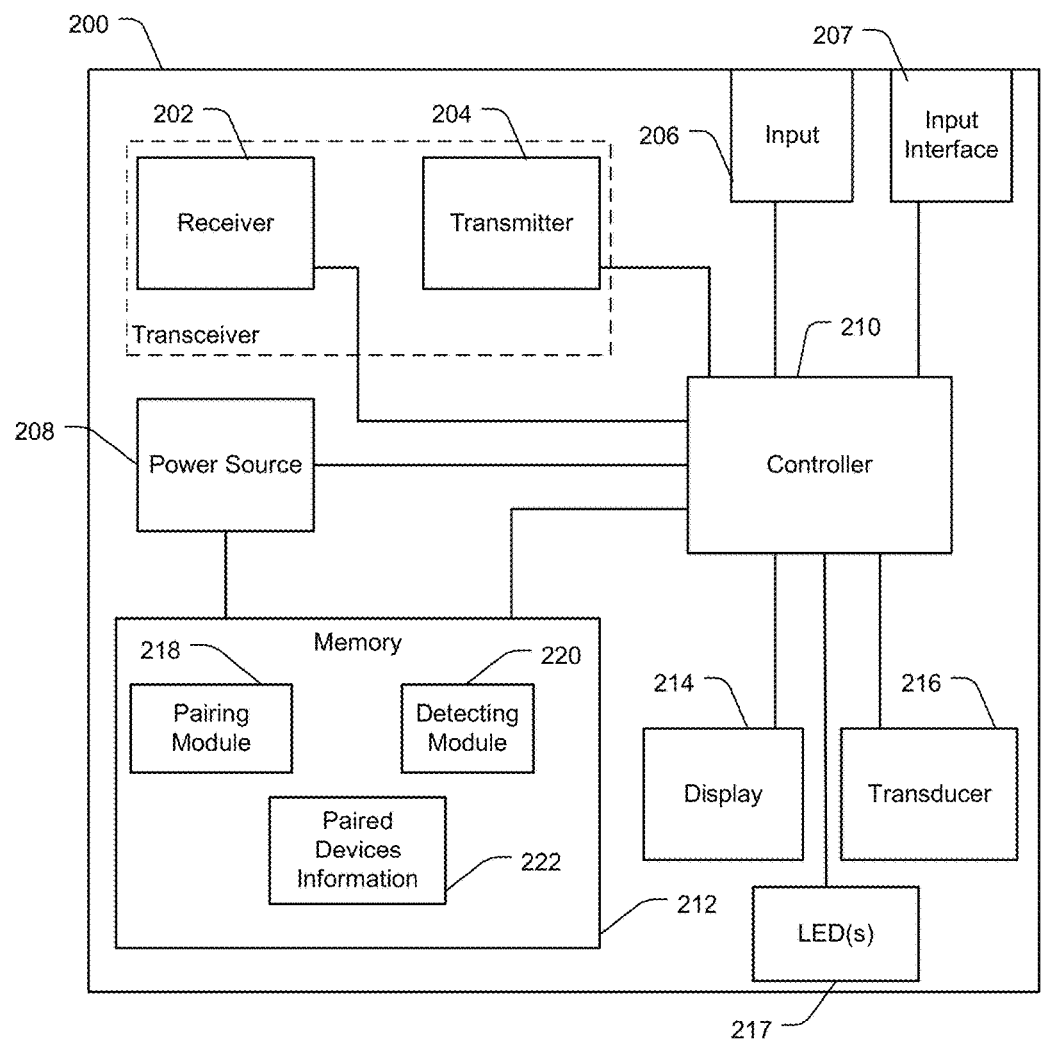
FIG. 2 is a block diagram of a wearable device, in accordance with certain embodiments of the present disclosure.

FIG. 2 is a diagram of a wearable device 200, such as a bracelet, in accordance with certain embodiments of the present disclosure. The wearable device 200 may correspond to the bracelet 100 of FIG. 1, and the components of the wearable device 200 may be incorporated within the body 104 or other housing unit of the bracelet 100.

The wearable device 200 may include a receiver 202 and a transmitter 204. The wearable device 200 may detect paired devices or recognized frequencies via the receiver 202, and may issue signals via the transmitter 204 that may be recognized by other devices. The receiver 202 and transmitter 204 may include any type of receivers and transmitters configured to receive and send information using a wireless signal protocol, such as radio waves, Bluetooth®, Radio-frequency identification (RFID), Wi-Fi, other wireless frequencies or protocols, or any combination thereof. Receiver 202 and transmitter 204 may optionally be incorporated into a single transceiver component. The wearable device 200 may include multiple types of transmitters 204, receivers 202, or both. For example, different transmitters 204 may transmit signals at different frequencies, use different protocols, or both. As an example, the wearable device 200 may be configured to send specific "find friends" notification signals to paired devices to indicate to the paired devices that the user of the wearable device 200 needs help or wants to be found. The "find friends" notification signal may use a stronger transmitter 204 or use a longer-range signal than the standard detection signals. In some embodiments, firmware or software upgrades may be received by one or more of the receivers 202 for updating the operation of the wearable device 200. Other embodiments are also possible.

The wearable device 200 may include one or more input elements 206, which may correspond to the input elements 108 of FIG. 1. In this particular example, the input elements 206 may include both a circuit element (such as a mechanical switch coupled to a printed circuit board) and a user-accessible button or switch (which may extend outside of or which may be accessible via an exterior surface of a housing of the wearable device). In an example, the input elements 206 may include components, such as buttons, touchscreens, knobs, switches, other input elements, or any combination thereof, and a corresponding circuit switch or button, such that the input element can be accessed by a user to provide an input to the wearable device 200. The input element 206, when accessed by a user, may produce a signal that can be received by a controller 210 of the wearable device 200.

In an example, the input element 208 may be accessed to power the wearable device 200 on or off, to synchronize or pair the wearable device with other devices, to reset a pairing, to assign particular notifications or notification patterns, to initiate a "find friends" operation, to access other modes or functions, or any combination thereof. For example, when a user presses an "on/off" button, the controller 210 may receive a signal that may cause the controller 210 to alter its power state, which may also cause the controller 210 to control one or more of the LEDs 217 to flash a pre-determined number of times and may also cause the controller 210 to send a signal to the transducer 216 to produce an audible output (such as a beep), indicating that the wearable device 200 is "ON". After a pre-determined period of time, such as after three (3) seconds, the controller 210 may control one or more of the LEDs 217 to stay on or may cause the LEDs to periodically blink. To synchronize with another device, a user may press and hold one of the input elements 206 while another user presses and holds a corresponding button, at the same time, on his or her own device. In another example, a user may interact with the input element 206 to reset or erase a connection (pairing) to another device, such as by pressing and holding a combination of input elements 206.

In some embodiments, input interface 207 may include wired or wireless interfaces for communicating with another device, such as computing devices (e.g. laptop computers, smartphones, etc.), external control peripherals (e.g. keyboards, pointer devices, etc.), or other devices. For example, the input interface 207 may include a micro universal serial bus (USB) port, allowing the wearable device 200 to connect to a power supply to charge the power source 208. The input interface 207 may permit the controller 210 to communicate with other computing devices, such as to receive and store program instructions or updates, ringtones or music files, or to receive additional information. For example, a user may use a computer to type in names or notices to be displayed when specified signals (specific paired devices) are detected, which information may then be transmitted to the wearable device 200 via the input interface 207 and stored to a memory 212. Other embodiments are also possible.

The wearable device 200 may include the controller 210, which may control operation and functionality of the wearable device 200. The controller 210 may compare received signal patterns or signatures against stored values to determine whether a received signal corresponds to a paired or recognized device. Signal patterns or identifiers may be stored to a memory 212 and retrieved for comparison. The controller 210 may also determine whether detected devices or signals are within a threshold distance for activating notice indicators. For example, the controller 210 may use a received signal strength indicator (RSSI), received signal frequency, or other metrics to determine an approximate distance or range to a device transmitting the signal. The controller 210 may compare the estimated range to a threshold range to determine whether to activate a proximity indicator. The controller 210 may include one or more circuits, microprocessors, memories (e.g. such as memory 212), other components, or any combination thereof. The controller 210 may execute software or firmware instructions to perform operations of the wearable device 200, such as detecting and pairing other devices, storing data identifying paired devices, transmitting signals, operating display elements 214, activating transducers 216, performing other operations, or any combination thereof.

A power source 208 may provide power to the controller 210, the memory 212, or any other components of the wearable device 200. Power source 208 may include one or more batteries. In certain embodiments, power source 208 may include addition elements to receive or generate power, such as solar energy collection panels, movement-powered or kinetic generators, charging ports (e.g. a mini-USB cable port), wireless inductive energy charging components, other power receiving or generation elements, or any combination thereof. The wearable device 200 may be partially or fully powered by the movement of the wearer's arm using movement-powered generators, reducing or eliminating the need to replace batteries or plug in the wearable device 200 for charging.

The wearable device 200 may include a memory 212, which may include one or more volatile or nonvolatile memory devices. The memory 212 may store data, computer-executable instructions, other information, or any combination thereof. The memory 212 may store one or more modules including instruction sets that, when executed, cause controller 210 to perform particular operations. In other embodiments, the modules described herein may be implemented as devices, such as controllers, application-specific integrated circuits (ASICs), field-programmable gate arrays (FPGAs), processors, other processing devices, or any combination thereof.

The memory 212 may store a pairing module 218 that, when executed, may cause the controller 210 to perform operations to pair the wearable device 200 with another device. For example, pairing operations may include using the receiver 202 to detect a signal from another device, and store information about the other device, such as a signal pattern or identifier. Pairing operations may also include generating a signal to make the wearable device 200 discoverable by other devices for pairing purposes. In a particular example, user interactions with one or more of the input elements 110 may cause the controller 210 to execute the pairing module 218 and to perform various pairing (or synching) operations to associate the wearable device 200 to another device, which may be another similar wearable device 200 or another wearable electronic device, such as a pendant, for example.

The memory 212 may also store a detecting module 220 that, when executed, may cause the controller 210 to perform operations to detect other paired devices, and to generate an indication when a paired device is discovered. For example, device detecting operations may include monitoring signals received via the receiver 202, and comparing information from the received signal against stored data corresponding to paired devices. Detection operations may also include evaluating or estimating a distance of a device issuing the detected signal, and comparing the distance to a notification threshold at which to generate a proximity indicator. If the data from a received signal matches stored information for a paired device, the detecting module 220 may cause the controller 210 to generate a signal to control a circuit element to provide an indication that a paired device is nearby. In an example, the signal may cause a display 214 to provide a light or message, may cause a transducer 216 to convert a signal into a detectable output (such as a sound or vibration), or may selectively activate an LED (such as by to turn on, flash, or change colors, and so on.

The memory 212 may also store information regarding paired devices 222. The paired device information 222 may include a list or database of information identifying paired devices, such as device identifier (ID) numbers, a particular signal pattern, a code, a bit sequence, encryption keys or values, other identifying information, or any combination thereof. For example, during a device pairing operation, the controller 210 may receive a signal from another device via the receiver 202, and the received signal may include information identifying the other device. The controller 210 may store the device identifying information in a table stored to the memory 212. Other information may be stored for paired devices as well. For example, information may be received via input element 206 that a particular paired device belongs to a person named "Suzy," and Suzy's name may be stored along with the paired device information 222. When the device belonging to Suzy is detected, the controller 210 may generate a notice indicating that Suzy is nearby. As discussed above, the notice may include presenting the device owner's name to a display, illuminating a particular LED (or combination of LEDs), playing a sound, or any combination there.

A wearable device 200 may also identify paired devices by different types of frequencies or wireless communication types (e.g. device 1 is paired via Bluetooth, while device 2 is paired via FM radio waves). The wearable device 200 may have different signal processing channels for each paired device. Methods of identifying paired devices are not limited to these provided examples.

Multiple devices may share the same identifying information. For example, some wearable devices may include accessories branded for a specific sports team, and all wearable devices bearing the sports team's branding may share the same device ID or other identifying information, or may send out the same signals. By storing paired device information 222 including the shared identifying information, the wearable device 200 may recognize when any device having the sports team's brand is in range.

A wearable device 200 may include paired device information 222, which may be written to the memory 212 by a manufacturer or distributor, such that the paired device information 222 is pre-stored before a consumer purchases the product. For example, multiple wearable devices may be sold as a set, with each wearable device pre-configured to recognize the other devices in the set. A sports team-branded wearable device may be pre-configured to recognize other wearable devices having the same team branding, or to recognize any other team-branded device for the same sports league. In this example, in addition to the pre-stored data, the user may also configure the wearable device 200 to pair with another device. Other embodiments are also possible.

The wearable device 200 may include a display 214. The display 214 may correspond to a display component variation of indicator element 110 of FIG. 1. The controller 210 may generate signals or indicators using the display 214. The display 214 may include one or more LEDs, and the controller 210 may control the LEDs to flash to indicate a state of the wearable device 200 or to indicate that a paired device is nearby, or has moved out of range. For example, the controller 210 may generate a sequence of flashes to indicate when the wearable device 200 is in a pairing mode, to indicate when a pairing operation has been successful, to indicate power-on or power-off commands for the wearable device 200, or to indicate other status indicators. The controller 210 may cause LEDs to flash when a signal is received from a paired device, which may indicate that a paired device is within a pre-determined range of the wearable device 200. The controller 210 may also cause LEDs to flash, vibrating elements to activate, or generate other visual, audible, or haptic signals when a paired device goes beyond a predetermined range. The display 214 may include a digital display screen, and the controller 210 may provide information to the display 214 to indicate proximity events, and in some embodiments to identify the paired device or the device's owner. For example, the controller 210 may generate a message stating "Your friend, Suzy, is here!"

The wearable device 200 may include a transducer 216, which may convert electrical signals into another form. For example, the transducer 216 may include a piezoelectric motor to provide haptic feedback, such as a vibration. Transducer 216 may also include a speaker or other noise-generating components. The controller 210 may generate sounds using the speaker 216 to indicate a state of the bracelet (e.g. two beeps indicate pairing mode has been activated), or to indicate that a paired device is nearby. The wearable device 200 may store one or more "ringtones" or music files, and may play one when a paired device is nearby. For example, a particular ringtone may be associated with a paired device in the paired devices information 222, so that when a particular paired device is detected, the controller 210 plays the associated ringtone using the speaker 216. The speaker 216 may be used to play spoken phrases or audio messages. In an example embodiment where the wearable device 200 detects another device branded by a "Chargers" sports team, the wearable device 200 may announce "Go Chargers!", or may play a fight song associated with the Chargers. Other embodiments are also possible.

The wearable device 200 may optionally be configured to pair to a limited number of other devices. The wearable device 200 may be configured to only pair to one other device, or to two other devices. For example, the wearable device 200 may be a "best friend" bracelet, which can only pair to one other bracelet. A user may choose to mutually pair his or her wearable device 200 to a bracelet belonging to the user's best friend. In some embodiments, the wearable device 200 may have a number of display elements 214 equal to the number of devices to which the wearable device 200 can be paired. Each paired device may be associated with one of the display elements 214 (or indicator), so that a particular display element 214 lights up to indicate when the associated paired device is nearby.

In some embodiments, the wearable device 200 may include a reset input, allowing a user to erase one or more entries from the paired device information 222, to pair the wearable device 200 to another device, to restore default (factory) settings, and so on. Paired device information 222 may also be overwritten, for example by initiating a pairing mode and pairing to a new device without first clearing the existing paired device information. Other embodiments are also possible.

It should be understood that the wearable elements described in FIGS. 1 and 2 may be implemented in a variety of form factors, including wrist bands, watches, pendants, pins, headbands, hair clips, and so on. Further, each wearable device may communicate with one or more other devices to form a synched pairing, which can then enable the detection functions described above. Depending on the specific implementation, the pairing may be indicated to the wearer in a variety of forms (lights, displays, audio signals, vibration, or any combination thereof). Further, as discussed above, the detection and pairing of such devices depends on the signal range of the devices, and a threshold received signal strength may be used to define a threshold pairing distance within which two devices may selectively notify their respective users. One possible example of such paired device ranges are described below in regard to FIG. 3.

Figure 3:
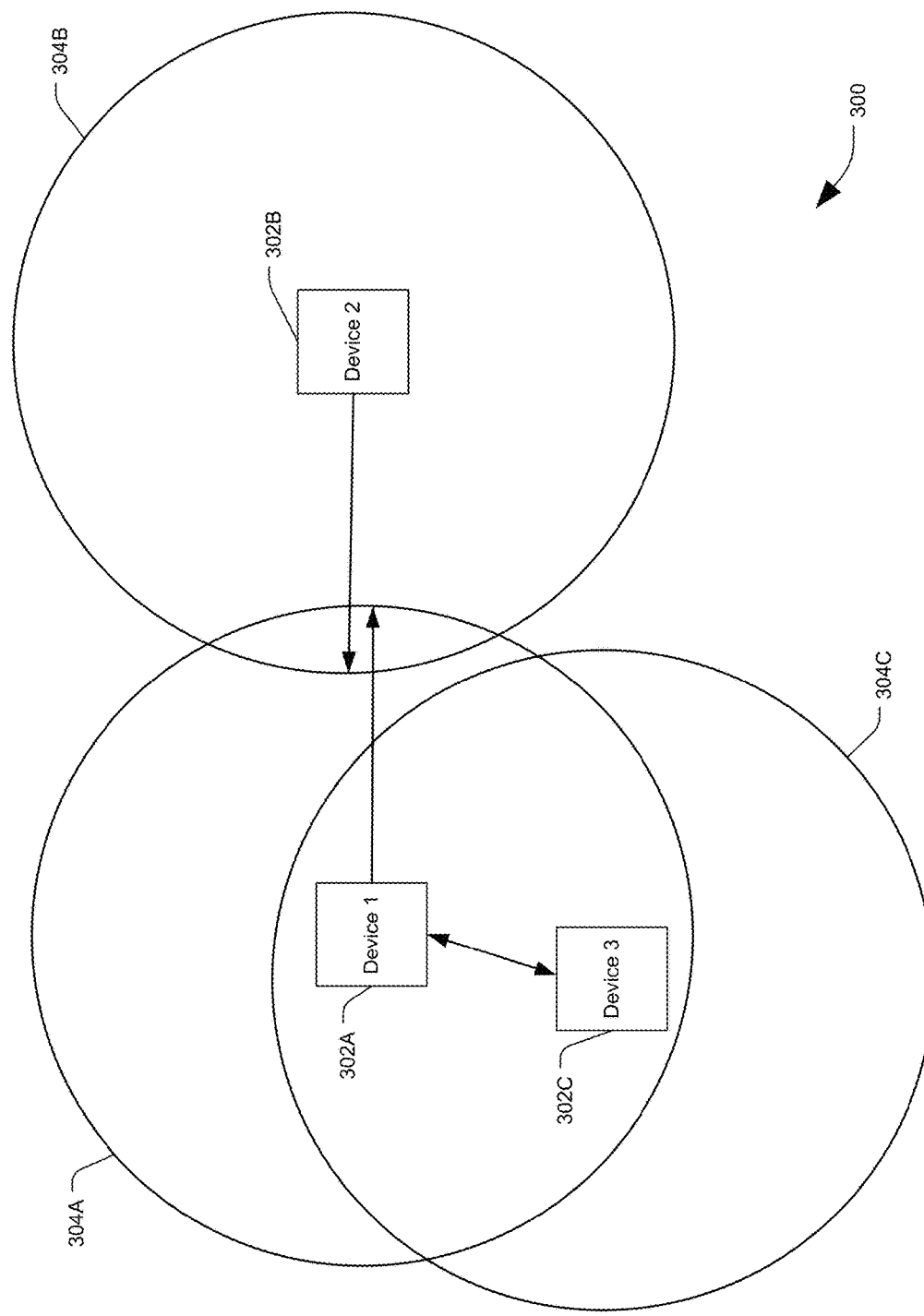
FIG. 3 is a conceptual diagram of a system including multiple wearable devices, in accordance with certain embodiments of the present disclosure.

FIG. 3 is a diagram 300 of wearable devices, such as a bracelets, in accordance with certain embodiments of the present disclosure. The diagram 300 shows a first device, device 1 302A, that has been configured to detect signals from device 2 302B and device 3 302C. The devices 302 may correspond to the bracelet 100 of FIG. 1, and the wearable device 200 of FIG. 2 or may correspond to another type of device having similar functionality.

Each device may have a range 304 within which it can detect paired devices, and accordingly issue notification signals via displays, vibration, or sounds. Device 1 302A may have detection range 304A; device 2 302B may have range 304B, and device 3 302C may have range 302C. The ranges 304 may be based on a maximum signal detection range, or may be selectable or configurable ranges, which may be based on a received signal strength. For example, if device 1 302A is configured to use a maximum detection range, device 1 302A may issue a notification whenever a paired can be identified, no matter how weak the signal. If device 1 302A is configured for a more particular range, device 1 302A may generate a notification only when a detected signal strength (or some other signal or range metric) is greater than a predefined threshold value. Although diagram 300 as discussed herein depicts a detection range 304 for each device 302, alternately the range 304 may be considered a broadcast range for the signal emitted by each device 302. Paired devices within a given device's broadcast range may detect the given device. Further, while the ranges 304 are shown to be approximately the same, in some embodiments, the ranges 304 may vary with each device. Other embodiments are also possible.

As discussed, devices 302 may be configured to generate notifications when a paired device signal comes within the range 304. Alternately, a device 302 may be configured to generate a notification when a paired device moves beyond the range 304. For example, a parent could wear one device and give a paired device to a child. If the child were to move beyond the range 304, the parent's device 302 may provide a notification so that the parent can make sure the child does not wander too far. The child's device may also issue a notification so that the child becomes aware that they have moved away from their parent. This system can improve safety on trips with children to stores, malls, or amusement parks, or may notify an adult if a child or pet leaves the house, for example. Further, in some embodiments, the device 302 may be configured to include a "hot/cold" mode that can cause the device 302 to vary the indicator to indicate when the device 302 is closer to or farther away from the paired device, thereby leading the wearer to the paired device.

Presuming device 1 302A is configured to generate a notification when a paired device comes within range 304A, device 1 302A would not generate a notification for device 2 302B, as device 2 302B is not within the range 304A of device 1 302A. However, device 3 302C is within the range 304A of device 1 302A, and therefore device 1 302A may generate a notification that device 3 302C has been detected within range 304A. Similarly, device 3 302C may generate a notice that device 1 302A is within range 304C. No other devices may be within range 304B of device 2 302B, and accordingly device 2 302B may not generate any notices. Similarly, in an embodiment where device 1 302A is configured to generate a notification when a paired device leaves the range 304A, device 1 may generate a notification for device 2 302B, but not for device 3 302C.

The types of signals or frequencies employed may depend on an intended application of a device. For example, devices configured to detect when a paired device comes in range may employ a wireless communication type with a long range and low interference from physical obstructions. Devices configured to detect when a paired device gets too far away may employ a signal type that can be configured or is effective at short range, that is not effective at passing through physical obstacles (e.g. due to frequency attenuation), or is otherwise likely to generate a signal when a paired device moves far away or otherwise out of sight. In some embodiments, the device 302 may be configure to change from a first signaling mode or frequency to a second signaling mode or frequency, depending on the operating mode, so that, for example, the longer range frequency may be used to track a missing paired device once it leave the proximity range of the first signaling frequency. Other embodiments are also possible. The following flowcharts provide example methods of employing a wearable device as described herein.

Figure 4:
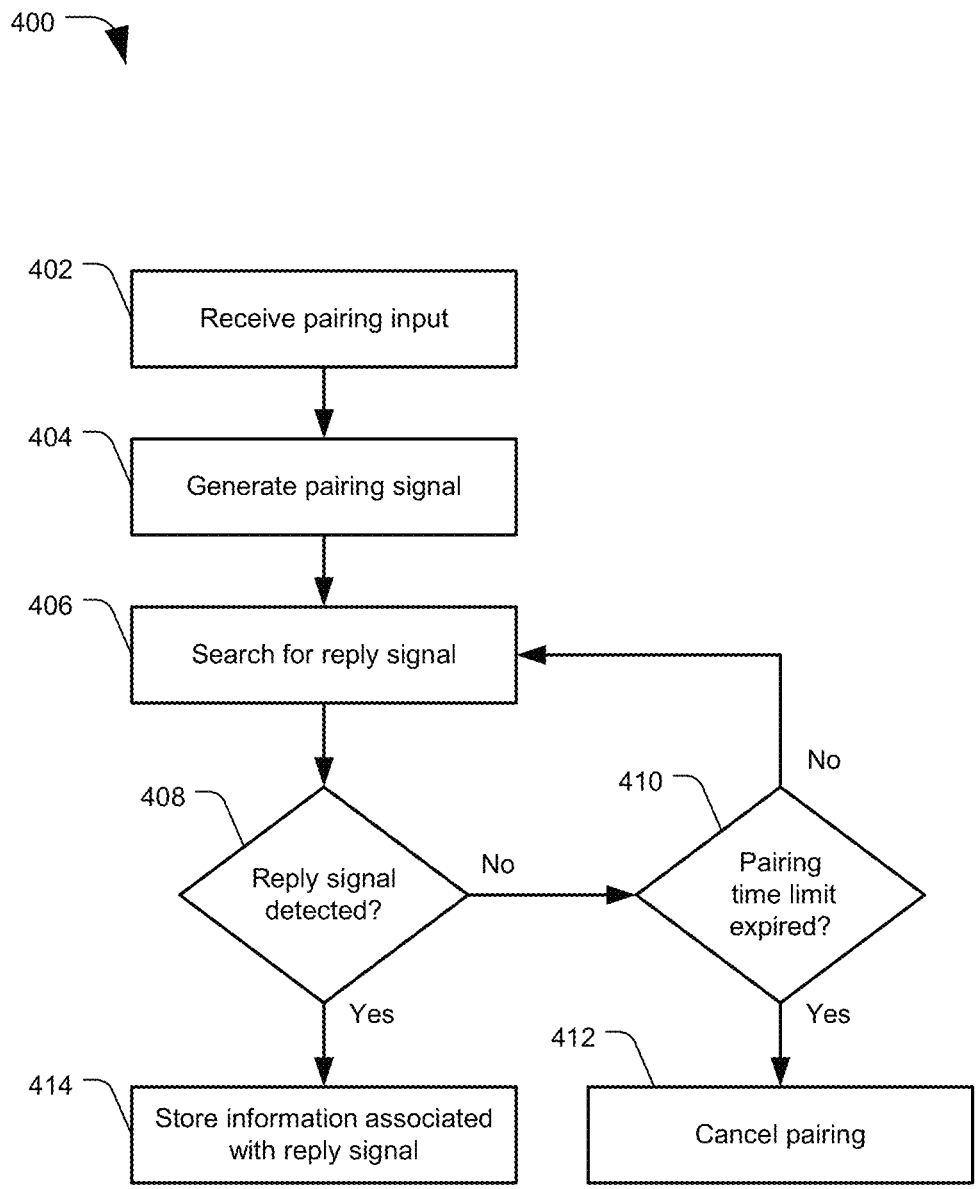
FIG. 4 is a flowchart of a method of device pairing using a wearable device, in accordance with certain embodiments of the present disclosure.

FIG. 4 is a flowchart of a method 400 of device pairing using a wearable device, in accordance with certain embodiments of the present disclosure. The method 400 may be performed by the bracelet 100 of FIG. 1 or the wearable device 200 and associated components described in relation to FIG. 2. Referring to the elements of FIG. 2, the controller 210 may receive indication selection via input element 206 directing the wearable device 200 to initiate a pairing operation. The controller 210 may access the pairing module 218 in response to the received indication, and perform the pairing method described below.

The method 400 may include receiving a pairing input, at 402. For example, when a pairing button or combination of buttons on the bracelet is depressed for a set number of seconds, an indication or signal may be produced that can be received by the controller and that may cause the controller to start a pairing operation. The method 400 may include generating a pairing signal in response to receiving the pairing input, at 404. For example, the bracelet may transmit a wireless signal, which may include identifying information for the bracelet, such as a device ID, code sequence, other information, or any combination thereof.

The method 400 may include searching for a reply signal, at 406. The bracelet may use a signal receiver element to detect if another device is transmitting a signal which can be used to identify the other device for pairing purposes. The method 400 may include determining whether a reply signal has been detected, at 408. If no reply signal has been detected, the method 400 may include determining if a pairing time limit has expired, at 410. For example, the reply signal seeking phase may last for a preset amount of time, such as ten seconds. If the pairing time limit has not expired, at 410, the method 400 may continue searching for a reply signal, at 406. If the pairing time limit has expired, at 410, the method 400 may include canceling the pairing operation, at 412.

If a reply signal is detected, at 408, the method 400 may include storing information associated with the reply signal, at 414. For example, a device ID or other unique identifier (UID) included in the reply signal may be stored to a memory of the bracelet. In some embodiments, the reply signal may include an encryption key or other security value. An encryption key may then be used to decrypt encrypted signals transmitted from the other device, allowing the bracelet to identify signals received from a paired device. Further, in some embodiments, the user may configure a tone, a notification sequence, a name, or other settings associated with the particular device ID. A method of detecting paired devices is described in regard to FIG. 5.

Figure 5:
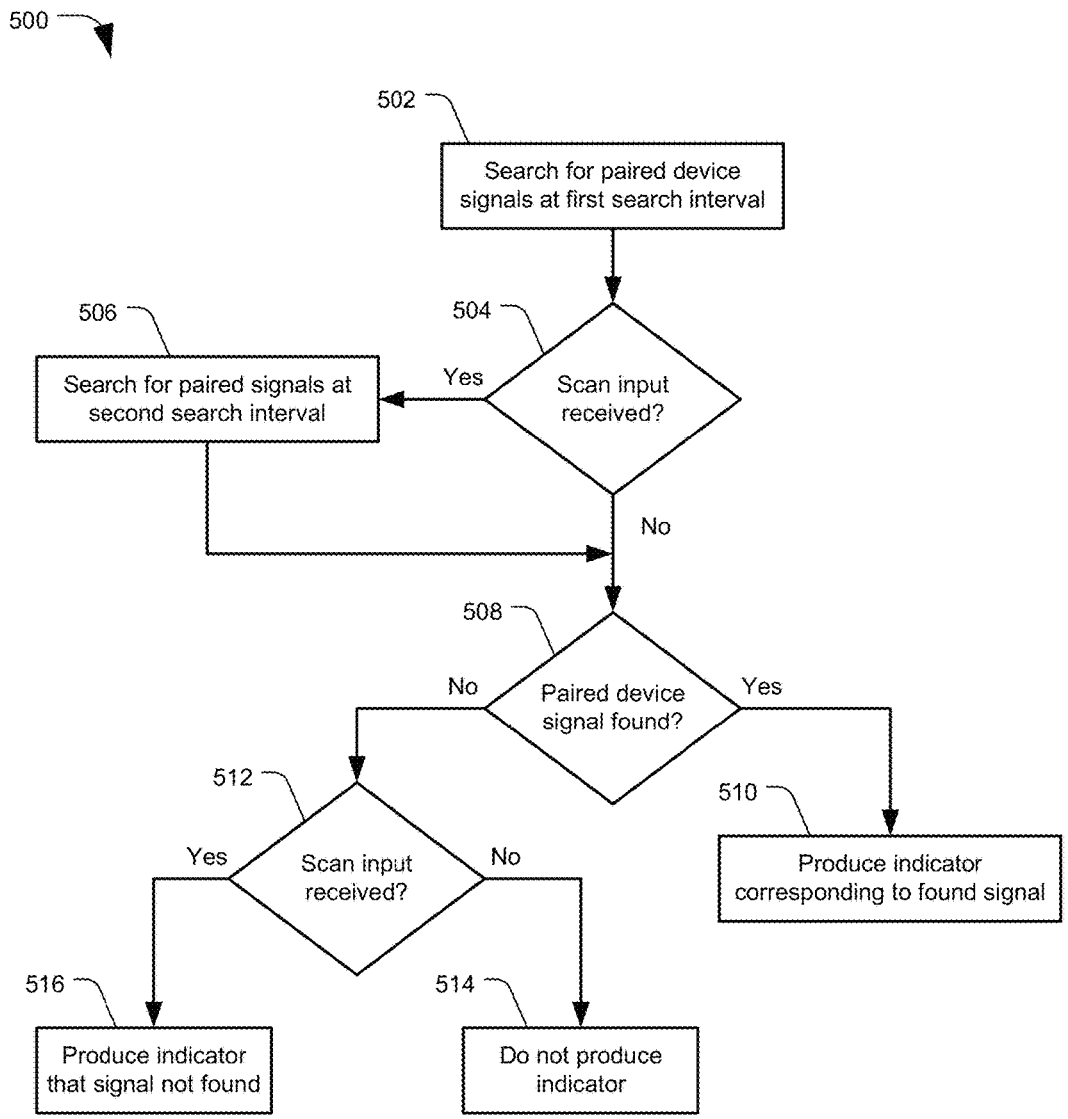
FIG. 5 is a flowchart of a method of paired device detection using a wearable device, in accordance with certain embodiments of the present disclosure.

FIG. 5 is a flowchart of a method 500 of paired device detection using a wearable device, in accordance with certain embodiments of the present disclosure. The method 500 may be performed by the bracelet 100 in FIG. 1 or the wearable device 200 and associated components described in relation to FIG. 2.

The method 500 may include searching for paired device signals at a first search interval, at 502. A bracelet may periodically check for signals from a paired device while the bracelet is in a powered-on state. In other embodiments, a bracelet may be put into a "searching" mode in response to a user interaction in order to search for signals from paired device, and may not search for paired device when not in a searching mode. A bracelet may also do both; searching automatically at a first interval, and performing an on-demand or shorter interval search in response to a user input. Searching for paired device signals may include periodically checking signals received at a receiver, and comparing received signals against a list of data for paired devices. The first search interval may be any period of time, such as searching once every five seconds, once every thirty seconds, once every minute, or some other interval. Longer intervals may conserve battery life, while shorter intervals may be more likely to detect paired devices sooner. Search interval duration may be set by a manufacturer or set by a user.

The method 500 may include determining whether a scan input has been received at the bracelet, at 504. A bracelet may receive an input from a button or other input directing the bracelet to scan for paired device signals more immediately. For example, the bracelet may search for paired signals at a default first search interval of once per thirty seconds. A user may anticipate a friend arriving with another paired device, and may press a button directing the bracelet to scan more frequently or immediately. In this manner the user may be notified more quickly when the friend arrives.

If a scan input was received, at 504, the method 500 may include searching for paired signals at a second search interval, at 506. The second search interval may include searching for paired device signals immediately, or may include a reduced search interval compared to the first search interval. For example, if the first search interval includes searching every thirty seconds, the second search interval may include searching every five seconds. The bracelet may use the second search interval for a period of time, such as for thirty seconds after a scan input is received, at which point the bracelet may resume using the first search interval. The bracelet may include the functionality to toggle between two or more search intervals, which a user may switch between using an input for the bracelet.

If a scan input was received at 504, searching may proceed at the second search interval. If no scan input was received at 504, searching may proceed at the first search interval. The method 500 may include determining if a paired device signal has been found, at 508. For example, received signals may be compared against a list of paired devices to determine if the received signals came from a paired device.

If a paired device signal is found, the method 500 may include producing an indicator corresponding to the found signal, at 510. Indicators may include producing light flashes, sounds, music, vibrations, printed messages, other indicators, or any combination thereof. The bracelet may produce the same indicator any time a paired device is detected. In some embodiments, different paired devices may be associated with different indicators. For example, each paired device may be associated with a different LED (or different combination of LEDs) on the face of the bracelet, so which LED is flashing may indicate which paired device has been detected. Different paired devices may also have associated ringtones, printed messages, flash patterns, light colors, or other distinguishing indicators.

If a paired device signal is not found, at 508, the method 500 may include determining whether the scan input was received, at 512. The scan input may be the same input discussed in relation to 504, such as a button or other input indicator directing the bracelet to perform an immediate scan or reduce the search interval. The determination at 512 may include determining whether a scan input was received at 504. If no paired device signal was found at 508 and no scan input was received at 512, the method 500 may include not producing any indicator, at 514. For example, the bracelet may be in an idle or standby mode, only performing searches at the first search interval (e.g. once every thirty seconds). The bracelet may not produce any indicator when no paired device is found. If a determination is made that a scan input was received, at 512, the method 500 may include producing an indicator that no paired device signal was found. For example, in response to a user pressing a "scan" button, the bracelet may perform a scan and, if no paired signals were found, may notify the user that no paired devices are in range. Whether any paired device was located or not, the bracelet may resume searching for paired devices, at 502. The bracelet may be configured to generate an indicator when a paired device first comes in range, and may then stop producing indicators for that device for a period of time (e.g. one hour), or until the paired device leaves the notification range.

Figure 6:
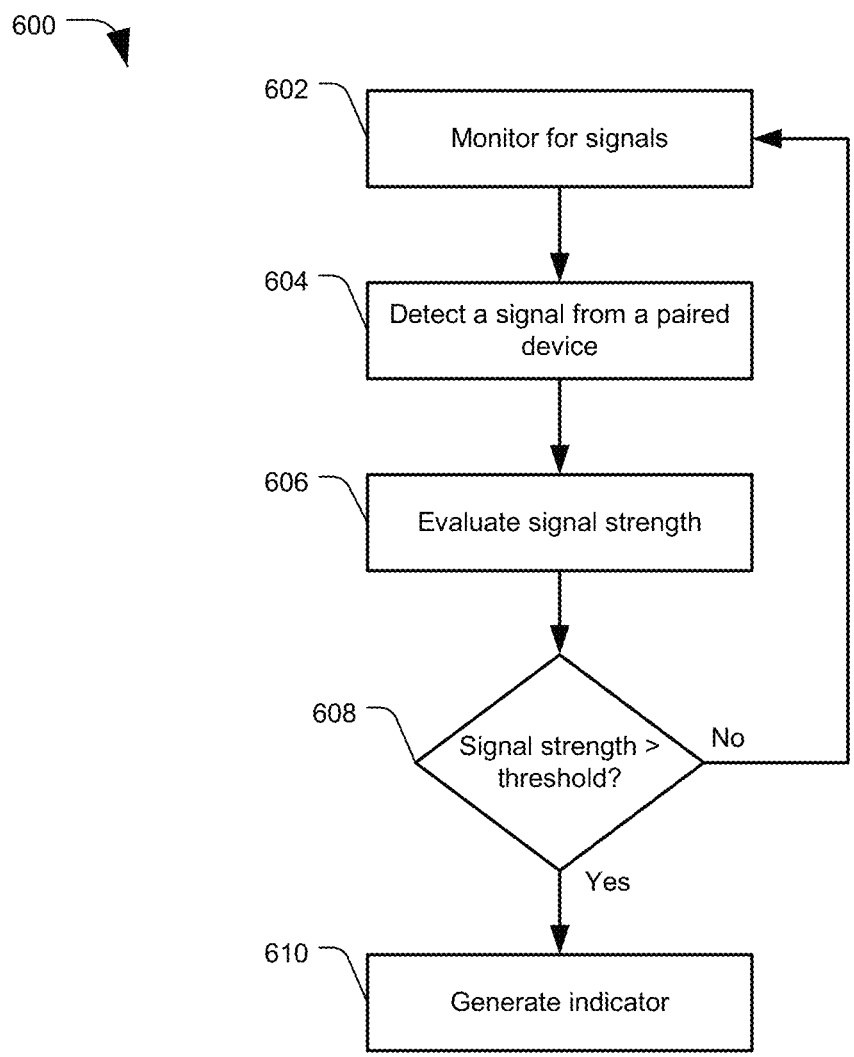
FIG. 6 is a flowchart of a method of paired device detection using a wearable device, in accordance with certain embodiments of the present disclosure.

FIG. 6 is a flowchart of a method 600 of paired device detection using a wearable device, in accordance with certain embodiments of the present disclosure. In particular, method 600 may be applied to determine whether a paired signal is "detected" and a notification should be generated, as in method 500 at 508. The method 600 may be performed by the wearable device 200 and associated components described in relation to FIG. 2.

At 602, method 600 may include monitoring for signals. At 604, a signal from a paired device may be detected. The method 600 may include evaluating a signal strength of the detected signal, at 606. For example, a range or sensitivity of the bracelet may be set via adjusting a signal strength or other signal metric necessary to trigger a notification. A threshold value for the signal strength or other signal metric may be set by a manufacturer or by a user.

A determination may be made whether the signal strength or other metric is greater than the threshold value, at 608. If not, the detected signal may be too faint or distant, and no indicator may be generated. The bracelet may resume monitoring for signals, at 602. If the signal strength is greater than the threshold, the method 600 may include generating an indicator, at 610.

The method 600 may be for devices configured to generate an indicator when a paired device comes within range. For devices configured to generate an indicator when a paired device moves beyond a selected range, the "yes" and "no" values on the decision point at 608 may be switched. Accordingly, when the signal strength is not greater than the threshold, indicating the paired device has moved beyond the desired range, an indicator may be generated at 610. If the signal strength is greater than the threshold value, then the paired device may still be within range, and the method 600 may resume monitoring for signals at 602 without generating an indicator.

Figure 7:
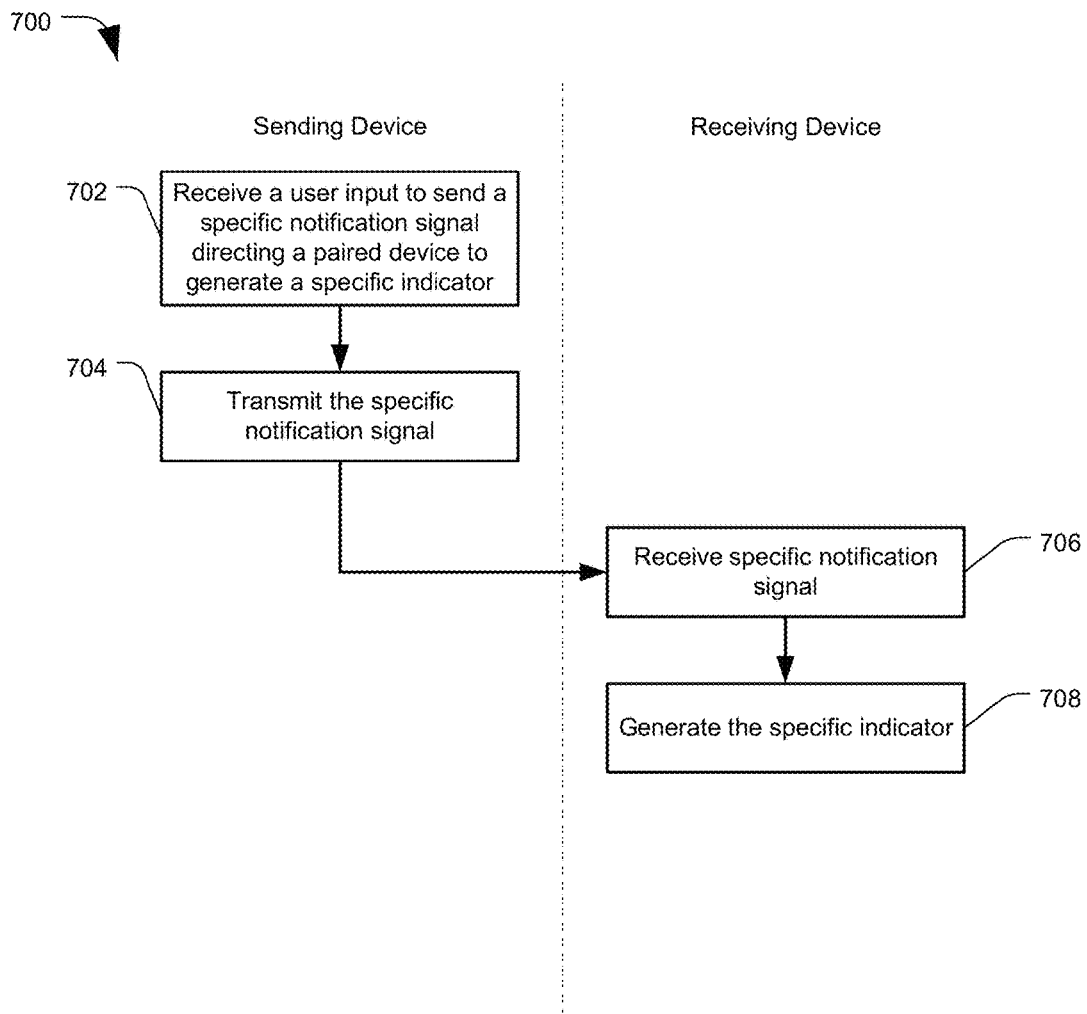
FIG. 7 is a flowchart of a method of sending a specific signal from a wearable device to a paired device, in accordance with certain embodiments of the present disclosure.

FIG. 7 is a flowchart of a method 700 of sending a specific signal to a paired device a wearable device, in accordance with certain embodiments of the present disclosure. In particular, method 700 may be used to send a specific signal from a first device to a paired device, directing the paired device to produce a specific indicator. The method 700 may be performed by the wearable device 200 and associated components described in relation to FIG. 2.

The method 700 may include receiving, at a first or sending device, a user input directing the first device to send a specific notification signal, at 702. The specific notification signal may direct a paired or receiving device to generate a specific indicator. For example, when a paired device comes within a certain range, a device may normally illuminate a white light. In response to receiving the specific notification signal, a device may instead illuminate a red light. Specific sounds or messages may also be generated in response to receiving the specific notification signal. For example, the owner of the first device may wish the owner of the receiving device to contact or come visit the owner of the first device, and can express this using the specific notification signal.

At 704, the sending device may transmit the specific notification signal in response to the user input. The specific notification signal may be transmitted using a different signal frequency, different signal strength, or different wireless communication protocol than the normally generated detection signal used by paired device to detect when the first device is in range. For example, it may be desirable for the specific notification signal to have a greater range than the detection signal. A paired device may also use the different signal format to differentiate the specific notification signal from the normal detection signal.

The receiving device may receive the specific notification signal, at 706. In response, the receiving device may generate the specific indicator, at 708. As discussed above, the specific indicator may include a flash pattern, a particular LED, a combination of LEDs, a displayed message, an audio signal, a vibration or vibration pattern, another detectable indication, or any combination thereof.

Figure 8:
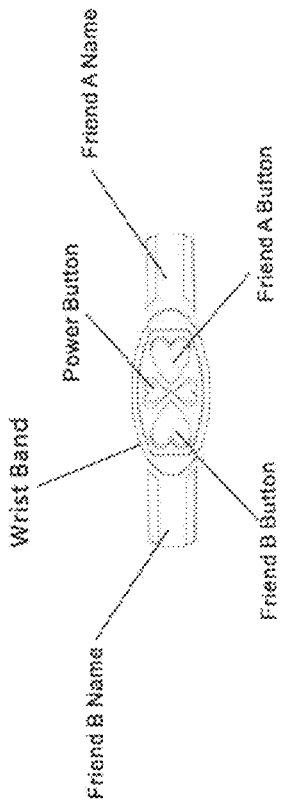
FIG. 8 depicts a diagram of a wearable device and an associated function chart, in accordance with certain embodiments of the present disclosure.

FIG. 8 depicts a diagram of a wearable device and an associated function chart, in accordance with certain embodiments of the present disclosure. FIG. 8 may be directed to an embodiment of a bracelet device. The bracelet may include a sleep or "powered-down" mode in which the bracelet does not search for other devices, a pairing mode in which the bracelet is paired with other devices, and a detecting mode in which the bracelet searches for nearby paired devices.

In the depicted embodiment, the bracelet may be configured to pair with two other devices, "friend A" and "friend B". The device may have two "friend" buttons, each of which may light up to provide visual indicators. The friend buttons may be used to program functionality of the bracelet and to associate that button with a particular paired device.

The bracelet may also include a power button to switch between sleep and "on" modes, or to direct the bracelet to switch from a power-saving thirty-second scan mode to a reduced-interval five-second scan mode. If the power button is not pressed for sixty seconds, the bracelet may return to the power saving scan mode. The bracelet may also include a speaker and may be configured to issue different sound patterns indicating operations or functionality being accessed, or to indicate when a paired device is detected. Other embodiments are also possible.

Figure 9:
FIG. 9 depicts a perspective view of a set of wearable devices, in accordance with certain embodiments of the present disclosure.

FIG. 9 provides a view of a set of wearable devices, in accordance with certain embodiments of the present disclosure. In the depicted embodiment, the wearable devices include a set of bracelets. In some embodiments, multiple wirelessly connectable bracelets may be packaged or sold as a set. Each bracelet may be configured to pair with the other bracelets in the set. For example, the bracelets may use a shared encryption key or set of encryption keys, allowing the bracelets to recognize signals from other bracelets in the set. For example, a shared encryption key may be applied to received signals, and received signals that decrypt to a recognized value may be identified as being received from a paired device.

Figure 10:
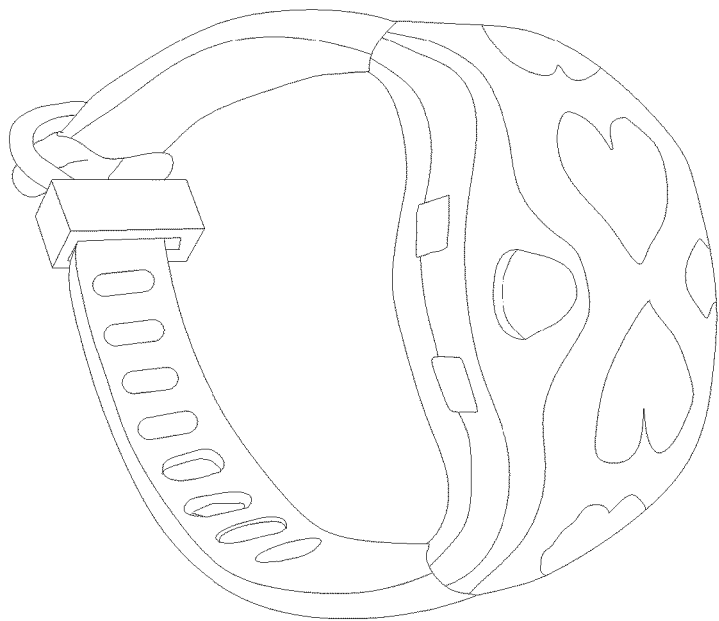
FIG. 10 depicts a perspective view of a wearable device, in accordance with certain embodiments of the present disclosure.

FIG. 10 provides a view of a wearable device, in accordance with certain embodiments of the present disclosure. FIG. 10 provides a view of an example configuration of face and side buttons on an example bracelet device. FIG. 10 also depicts a wrist strap having a plurality of slots on one strap, and a push-through tab or protrusion on the other strap configured to securely fit through the slots, in order to allow the wrist strap to be fitted to different-sized wrists. Buckles, buttons, hook-and-loop fasteners, or other securing mechanisms may also be used to provide adjustable-sized straps. Wearable devices may also include necklaces, pins, hair clips, rings, headbands, or other adornments or accessories.

Figure 11:
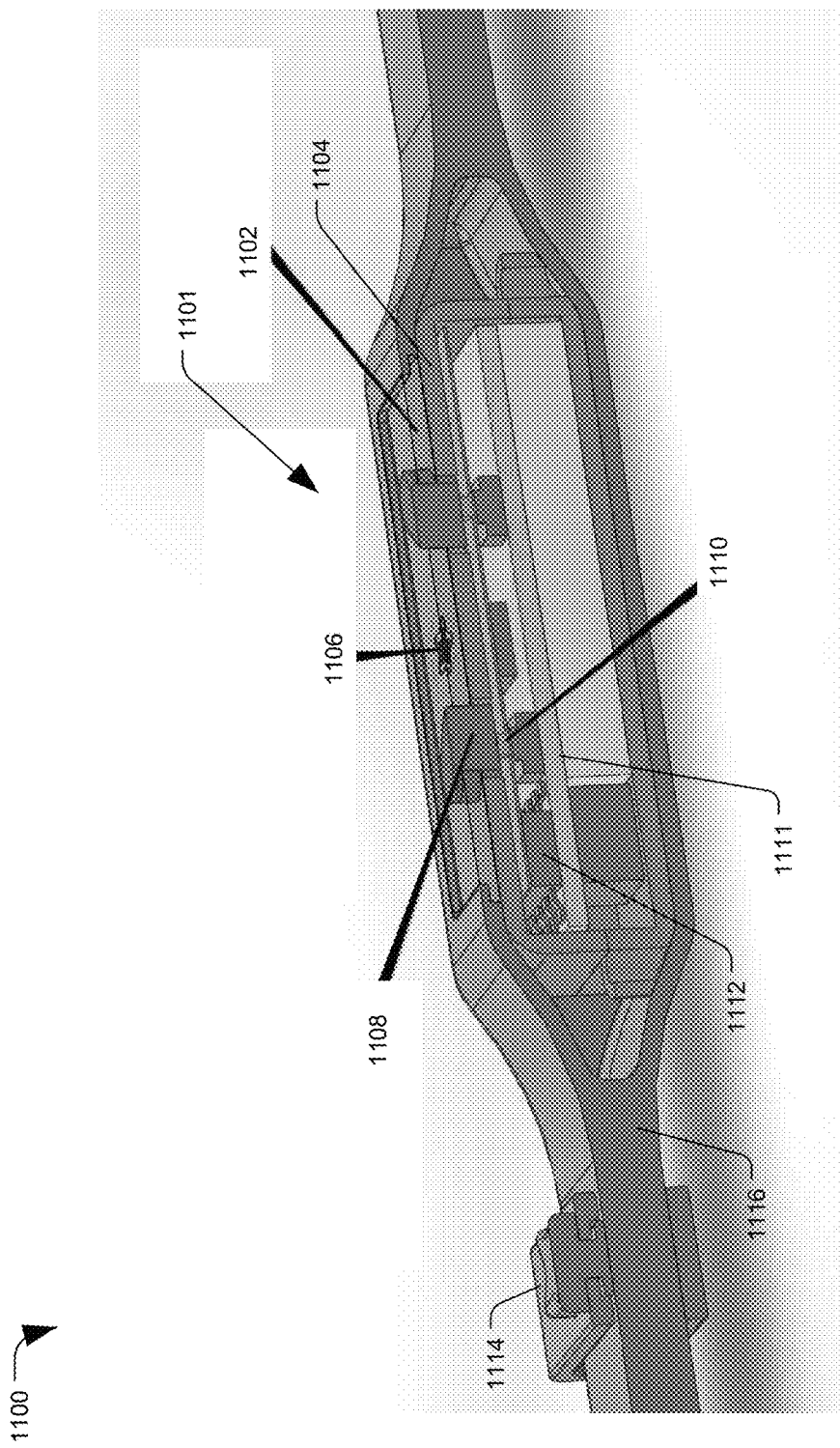
FIG. 11 depicts a cross-section view of a wearable device, in accordance with certain embodiments of the present disclosure.

FIG. 11 depicts a cross-section view of a wearable device 1100, in accordance with certain embodiments of the present disclosure. The device 1100 may include a wristband or bracelet-type accessory having a body portion 1101. In some embodiments, the body portion 1101 may define an enclosure sized to receive a circuit and a battery. The device 1100 may include a clear screen 1102 coupled to the body portion 1101. The clear screen 1102 may include an opaque layer 1104 underneath (e.g. plastic or vinyl) to obscure the internal components of the device 1100 and to include openings through which light may be emitted. For example, opaque layer 1104 may include one or more cutouts or openings 1106 in the opaque layer 1104 through which light may be emitted to indicate on/off changes, device pairing status, or other indicators. The cutout 1106 may be made in various shapes, such as hearts or flowers or the shape of a sports franchise logo (for example), to improve the aesthetic appeal of the device 1100.

Buttons 1108, which may have a selected shape (such as a heart shape, for example), may be fitted through holes in the screen 1102 and opaque layer 1104, and used to depress an actuator 1110 (button or switch) on a printed circuit board 1111 to provide user inputs to the device 1100. The buttons 1108 may also function as lights (e.g. being translucent plastic over an LED) to provide indicators of proximity of other detected devices or signals. A circuit 1112 on a printed circuit board may receive inputs, determine whether recognized device signals are detected, and control the operations of lights and other indicators of the device 1100. The device 1100 may also include one or more straps 1114 that may fit around a band 1116. The straps 1114 may be exchanged between friends whose devices have been synched, and may come with a variety of colors, shape designs, interchangeable covers, or other elements.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in certain embodiments blocks in the flow diagrams presented herein may be removed, combined, or rearranged without departing from the scope of the disclosure.

Further, in certain embodiments structural and functional elements within the diagrams may be combined, separated, or removed, without departing from the scope of the disclosure. Additionally, certain modules and components may be combined, or split into sub-components. In the various embodiments, functionality assigned to a particular component or module may be handled by another component instead, or various functions may be combined into a single module or application. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:
1. An apparatus comprising:
 a first wearable device including:
  an attachment mechanism configured to enable the first wearable device to be worn;
  a receiver configured to detect wireless signals;
  a control circuit configured to:
   monitor for a signal from a second wearable device paired to the first wearable device at a first search interval;
   receive a user scan input at the first wearable device; and
   search for the signal at a second search interval shorter than the first search interval based on the user scan input; and
   in response to detecting the signal at the second search interval, selectively generate an indicator based on a proximity of the second wearable device to the first wearable device.

2. The apparatus of claim 1, wherein the control circuit is further configured to generate the indicator in response to determining the proximity is less than a threshold range.

3. The apparatus of claim 1, wherein the control circuit is further configured to generate the indicator when the proximity changes from a first range that is less than the threshold range to a second range that is greater than the threshold range.

4. The apparatus of claim 1, wherein the control circuit is further configured to determine the proximity of the second wearable device based on a received signal strength indicator associated with the wireless signals received from the second wearable device.

5. The apparatus of claim 1, wherein:
the first wearable device includes a bracelet; and
the attachment mechanism includes a wrist band.

6. The apparatus of claim 1, wherein:
the first wearable device includes a pendant; and
the attachment mechanism includes a necklace.

7. The apparatus of claim 1, wherein the control circuit is further configured to:
receive a user input at the first wearable device; and
in response to receiving the user input, transmit a notification signal to the second wearable device directing the second wearable device to generate a specific indicator based on the notification signal.

8. The apparatus of claim 1 wherein:
the first wearable device further includes a transmitter configured to transmit wireless signals; and
the control circuit is further configured to transmit a detection signal via the transmitter, the detection signal configured to identify the first wearable device to wearable devices paired to the first wearable device.

9. The apparatus of claim 8, wherein the control circuit is further configured to:
encrypt the detection signal with a stored encryption key prior to transmitting;
receive the signal from the second wearable device via the receiver; and
apply the stored encryption key to the signal to identify the second wearable device.

10. The apparatus of claim 1, wherein:
the first wearable device further includes a display element associated with each of one or more other wearable devices paired to the first wearable device; and
the control circuit is further configured to:
pair to the one or more other wearable devices;
store identifying information for each of the one or more other wearable devices paired to the first wearable device;
determine when a detected signal corresponds to identifying information for one of the one or more other wearable devices; and
activate the display element associated with the wearable device corresponding to the detected signal.

11. The apparatus of claim 1 comprising the control circuit further configured to:
receive a pairing input via a first input element;
generate a pairing signal in response to the pairing input;
search for a reply signal from the second wearable device via the receiver;
in response to determining the reply signal, store information associated with the reply signal in a memory to pair the first wearable device to the second wearable device; and
identify the reply signal from the second wearable device based on the stored information.

12. A device comprising:
a first bracelet including:
a transceiver to transmit and receive wireless signals;
a control circuit configured to:
pair with a second bracelet via the transceiver by exchanging identifying information with the second bracelet by:
receiving a pairing input via a first input element;
transmitting a pairing signal including identifying information for the first bracelet via the transceiver in response to receiving the pairing input;
search for a reply signal from the second bracelet via the transceiver, the reply signal including identifying information for the second bracelet;
store the identifying information associated with the second bracelet subsequently, detect a particular signal associated with the second bracelet;
determine a proximity of the second bracelet to the first bracelet based on the particular signal; and
generate an indicator based on the proximity.

13. The device of claim 12, wherein the control circuit is further configured to generate a detection signal via the transceiver configured to allow the second bracelet to determine a proximity of the first bracelet to the second bracelet.

14. The device of claim 13, wherein the indicator is selected from a group consisting of light flashes, sounds, and displayed messages.

15. The device of claim 12, wherein:
the first bracelet further includes a plurality of display elements, each display element associated with one of a plurality of devices;
the circuit is further configured to:
store identifying information for each device of the plurality of devices that is paired to the first bracelet, at least one of the devices that is paired to the first bracelet including the second bracelet;
determine when a detected signal corresponds to identifying information for a determined paired device; and
activate the display element associated with the determined paired device corresponding to the detected signal.

16. The device of claim 15, wherein the control circuit is further configured to determine the proximity of the second wearable device based on a signal strength associated with the signal.

17. A wearable device comprising:
an attachment mechanism configured to enable the first wearable device to be worn;
a transceiver configured to send and receive wireless signals;
a plurality of display elements, each display element including a light emitting diode;
a control circuit coupled to the transceiver and to the plurality of display elements, the control circuit configured to:
determine a first received signal corresponding to a second wearable device that was previously paired to the first wearable device;
selectively control a first display element of the plurality of display elements to provide a first visible indication of proximity of the second wearable device in response to determining the first received signal;

determine a second received signal corresponding to a third wearable device that was previously paired to the first wearable device; and selectively control a second display element of the plurality of display elements to provide a second visible indication of proximity of the third wearable device in response to determining the second received signal.

18. The system of claim 17, further comprising:

a memory accessible to the control circuit and configured to store identifier data and other data associated with the second wearable device; and wherein the control circuit determines the received signal by comparing data determined from the received signal to data stored in the memory.

* * * * *